US008820517B2

(12) United States Patent
Gramby (10) Patent No.: US 8,820,517 B2
(45) Date of Patent: Sep. 2, 2014

(54) LATERAL PLATE ELEMENT FOR A LINK INCLUDED IN A SELF-STACKING ENDLESS CONVEYOR BELT

(75) Inventor: Goran Gramby, Bjarred (SE)

(73) Assignee: John Bean Technologies AB, Helsingborg (SE)

( * ) Notice: Subject to any disclaimer, the term of this patent is extended or adjusted under 35 U.S.C. 154(b) by 0 days.

(21) Appl. No.: 13/995,887

(22) PCT Filed: Oct. 6, 2011

(86) PCT No.: PCT/EP2011/067461
§ 371 (c)(1),
(2), (4) Date: Jun. 19, 2013

(87) PCT Pub. No.: WO2012/084286
PCT Pub. Date: Jun. 28, 2012

(65) Prior Publication Data
US 2013/0270073 A1 Oct. 17, 2013

(30) Foreign Application Priority Data

Dec. 21, 2010 (SE) ...................................... 1051354

(51) Int. Cl.
*B65G 21/18* (2006.01)
(52) U.S. Cl.
USPC ............................. 198/778; 198/848; 198/852
(58) Field of Classification Search
USPC ................................... 198/778, 848, 851, 852
See application file for complete search history.

(56) References Cited

U.S. PATENT DOCUMENTS 3,938,651 A * 2/1976 Alfred et al. ................... 198/778
4,565,282 A * 1/1986 Olsson et al. .................. 198/778
(Continued)

FOREIGN PATENT DOCUMENTS

WO 88/00566 A1 1/1988
WO 91/04209 A1 4/1991
(Continued)

OTHER PUBLICATIONS

International Search Report mailed Dec. 22, 2011, issued in corresponding International Application No. PCT/EP2011/067461, filed Oct. 6, 2011, 3 pages.

*Primary Examiner* — Leslie A Nicholson, III
*Assistant Examiner* — Keith R Campbell
(74) *Attorney, Agent, or Firm* — Christensen O'Connor Johnson Kindness PLLC (57) ABSTRACT

A lateral plate element (106) for a link for a self-stacking endless conveyor belt includes an outer plate section (110); an inner plate section (120); and a bridging plate section (130) bridging the outer and inner plate sections. A resting surface (141) engages a lateral plate element of an underlying tier of the self-stacking endless conveyor belt (1). An upper portion with an associated upper edge (7) engages the resting surface of a lateral plate element of an overlaying tier of the self-stacking endless conveyor belt when it extends helically. An inner abutment surface (126) engages the upper portion of the underlying lateral plate element to limit outward lateral movement of the lateral plate element relative the underlying lateral plate element. An outer abutment surface (142) engages the upper portion of the underlying lateral plate element to limit the inward lateral movement of the lateral plate element relative the underlying lateral plate element. A spacer element (127) limits outward lateral movement of the lateral plate element relative the underlying lateral plate element.

20 Claims, 8 Drawing Sheets

(56) References Cited

U.S. PATENT DOCUMENTS

| | | | |
|---|---|---|---|
| 4,899,871 A * | 2/1990 | Olsson | 198/778 |
| 4,941,567 A * | 7/1990 | Olsson | 198/778 |
| 5,183,149 A * | 2/1993 | Wierman et al. | 198/778 |
| 5,190,143 A * | 3/1993 | Froderberg et al. | 198/778 |
| 5,346,057 A * | 9/1994 | Fisher et al. | 198/778 |
| 5,458,228 A * | 10/1995 | Olsson | 198/778 |
| 6,237,750 B1 * | 5/2001 | Damkjaer et al. | 198/778 |
| 6,695,128 B2 * | 2/2004 | Palmaer et al. | 198/778 |
| 6,796,420 B2 * | 9/2004 | Byrne et al. | 198/822 |
| 7,178,662 B2 * | 2/2007 | Olsson et al. | 198/778 |
| 7,258,226 B2 * | 8/2007 | Nelson et al. | 198/778 |
| 7,270,231 B2 * | 9/2007 | Heber | 198/778 |
| 7,401,696 B2 * | 7/2008 | Miyanishi et al. | 198/778 |
| 7,500,555 B1 | 3/2009 | Liao | |
| 2004/0011627 A1 | 1/2004 | Palmaer | |
| 2005/0224316 A1 | 10/2005 | Miyanishi | |

FOREIGN PATENT DOCUMENTS

| | | |
|---|---|---|
| WO | 93/15984 A1 | 8/1993 |
| WO | 97/38925 A1 | 10/1997 |
| WO | 2005/038549 A2 | 4/2005 |

* cited by examiner

LATERAL PLATE ELEMENT FOR A LINK INCLUDED IN A SELF-STACKING ENDLESS CONVEYOR BELT

FIELD OF INVENTION

The present invention relates to an improved lateral plate element for a link included in a self-stacking endless conveyor belt, in which the conveyor belt extends helically along part of its length.

TECHNICAL BACKGROUND

Conveyor belts of the type described above are often used in air conditioning plants for e.g. quick-freezing or cooking of food products.

Such conveyor belts are usually made up of links which comprise upward extending lateral plate elements and at least two parallel transverse rods connected thereto. The links are interconnected in such a manner that the conveyor belt is turnable vertically and laterally.

The lateral plate elements of the links of the conveyor belt may, however, be designed in various ways. Examples of conveyor belts of the above type having differently designed lateral plate elements are e.g. described in WO87/04136, WO91/04209, EP1714918, U.S. Pat. Nos. 6,237,750 and 7,270,231, the disclosures of which are fully incorporated herein by reference.

Normally each lateral plate element includes an integrally formed outer one-half plate section and an inner one-half plate section. The outer one-half plate section is slightly offset outwardly with respect to the inner one-half plate section thereby enabling the inner one-half plate section on a link to extend over the inside surface of the outer one-half plate section on the adjacent link. During operation, the outer one-half plate section on a link and the inner one-half plate section on an adjacent link overlap and slide together as the belt moves along its path.

The conveyor belt may be arranged to travel in a straight path until it enters a spiral or helical configuration. When aligned in the helical configuration, the lowermost tier of the conveyor belt is supported by a drive system while each of the remaining tiers is supported by an underlying tier. The interface between adjacent tiers is designed to keep the belt supported and laterally aligned.

During use, an upper edge of the link in the underlying tier normally contacts the bottom surfaces of the transverse rods of the links in the overlying tier. The tiers are laterally aligned by resting said upper edge against said transverse rods and by guide tabs arranged on the links of the overlying tier.

As a further development the lateral plate elements are designed so that the upper edge of the lateral plate element in the underlying tier contacts a resting surface of the lateral plate element in the overlying tier, see for example U.S. Pat. Nos. 6,237,750 and 7,270,231. By designing the lateral plate elements to have such a resting surface resting said upper edge of the lateral plate element in the underlying tier against said transverse rods may be avoided. And consequently wear on the transverse rods which may lead to breakage may be avoided.

By designing the lateral plate elements to have such a resting surface it must be safeguarded that the resting surface of a lateral plate element of an overlaying tier does not fall of the upper edge of a lateral plate element in the underlying tier. In other words it must be safeguarded that wedging between a lower and upper lateral plate element in the conveyor belt is prevented. This is typically achieved by guide tabs arranged on the lateral plate elements of the overlying tier.

However, there is still a need for improving the lateral plate element so that it is ensured that the resting surface of a lateral plate element of an overlaying tier does not fall of the upper edge of a lateral plate element in the underlying tier and so that it is ensured that wedging between a lower and upper lateral plate element in the conveyor belt along its helical path is avoided. Consequently, there is a need for an improved lateral plate element.

SUMMARY OF THE INVENTION

An object of the present invention is to provide an improved lateral plate element for a link included in a self-stacking endless conveyor.

Another object of the present invention to provide such a lateral plate element preventing wedging between a lower and upper lateral plate element in the conveyor belt.

At least one of these objects, and also other objects which will be evident from the following description, is achieved by the lateral plate element according to the claims of this application.

More specifically, according to the present invention, a lateral plate element for a link included in a self-stacking endless conveyor belt, in which the conveyor belt extends helically along part of its length is provided. The lateral plate element comprises an outer plate section, an inner plate section and a bridging plate section bridging said outer and inner plate sections, a resting surface arranged to engage a lateral plate element of an underlying tier of the self-stacking endless conveyor belt when it extends helically, an upper portion with an associated upper edge arranged to engage the resting surface of an overlaying tier of the self-stacking endless conveyor belt when it extends helically, an inner abutment surface arranged to engage the upper portion of the underlying lateral plate element, wherein the inner abutment surface limits outward lateral movement of the lateral plate element relative the underlying lateral plate element, an outer abutment surface arranged to engage the upper portion of the underlying lateral plate element, wherein the outer abutment surface limits inward lateral movement of the lateral plate element relative the underlying lateral plate element and a spacer element arranged to further limit outward lateral movement of the lateral plate element relative the underlying lateral plate element.

This results in an improved lateral plate element having a spacer element being arranged to further prevent lateral movement between lateral plate elements of neighboring tiers of the conveyor belt. Accordingly the spacer element reduces the risk for the resting surface of a lateral plate element of an overlaying tier to fall of the upper edge of a lateral plate element in the underlying tier. Moreover, the spacer element reduces the risk of wedging between a lower and upper lateral plate element in the conveyor belt along its helical path.

The spacer element may be arranged at said upper edge and extending in an inward direction. By arranging the spacer element at said upper edge the interlock, i.e. the distance between the inner and outer abutment surfaces are not reduced. The extension of the spacer element in said inward direction is preferably 0.5-3 times the thickness of the plate material constituting the lateral plate element, more preferably 1-2 times the thickness of the plate material constituting the lateral plate element.

The spacer element may be arranged on the outer plate section. The spacer element may be arranged on the inner plate section.

The spacer element may be arranged on the inner abutment surface and extending in an outward direction. The extension of the spacer element in said outward direction is preferably 0.5-3 times the thickness of the plate material constituting the lateral plate element, more preferably 1-2 times the thickness of the plate material constituting the lateral plate element.

The spacer element may be in the form of a first bulge.

The spacer element may be a press shaped structure.

The spacer element may be point shaped. A point shape is easy to apply after the manufacture of the lateral plate element.

The spacer element may be elongate.

The lateral plate element may further comprise an upper edge extension means arranged at said upper edge and extending in an outward direction. The extension of the upper edge extension means in said outward direction may be 0.5-3 times the thickness of the plate material constituting the lateral plate element, more preferably 1-2 times the thickness of the plate material constituting the lateral plate element.

The upper edge extension means may be in the form of a second bulge.

The upper edge extension means may be a press shaped structure.

The upper edge extension means may be point shaped. A point shape is easy to apply after the manufacture of the lateral plate element.

The upper edge extension means may be elongate.

The offset between the said inner and outer abutment surfaces is preferably 2-6 times the thickness of the plate material constituting the lateral plate element, more preferably 3-5 times the thickness of the plate material constituting the lateral plate element.

According to another aspect of the invention a link for a self-stacking endless conveyor belt, in which the conveyor belt extends helically along part of its length is provided. The link comprises at least two transverse rods and two of the above lateral plate elements. The at least two rods are fixedly connected to the lateral plate elements in order to form the link.

According to yet another aspect of the invention a self-stacking endless conveyor belt, in which the conveyor belt extends helically along part of its length, is provided. The self-stacking endless conveyor belt comprises a plurality of the above mentioned interconnected links.

BRIEF DESCRIPTION OF THE DRAWINGS

The invention will by way of example be described in more detail with reference to the appended schematic drawings, which show presently preferred embodiments of the invention.

DETAILED DESCRIPTION OF PREFERRED EMBODIMENTS

Figure 1:
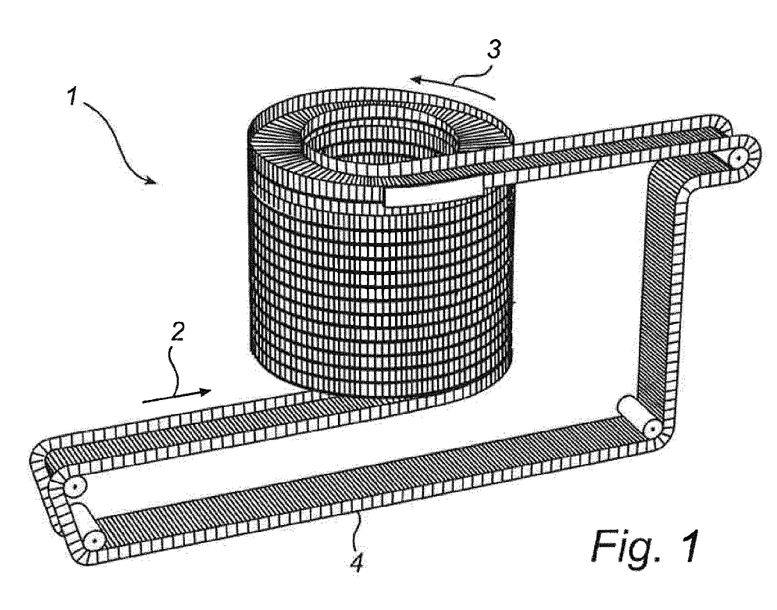
FIG. 1 is a perspective schematically showing an inventive self-stacking endless conveyor belt arranged in an endless configuration comprising straight paths and a helical path.

A self-stacking, endless conveyor belt 1 used to transport various products is shown in FIG. 1. The conveyor belt 1 is adapted to travel in straight and helical paths 2, 3, respectively. When traveling a helical path 3, the belt 1 is self-stacking with the overlying tiers resting on top of underlying tiers. The shown conveyor belt 1 comprises a plurality of interconnected links 4 and can run straight, through curves and upwards and downwards.

Figure 2:
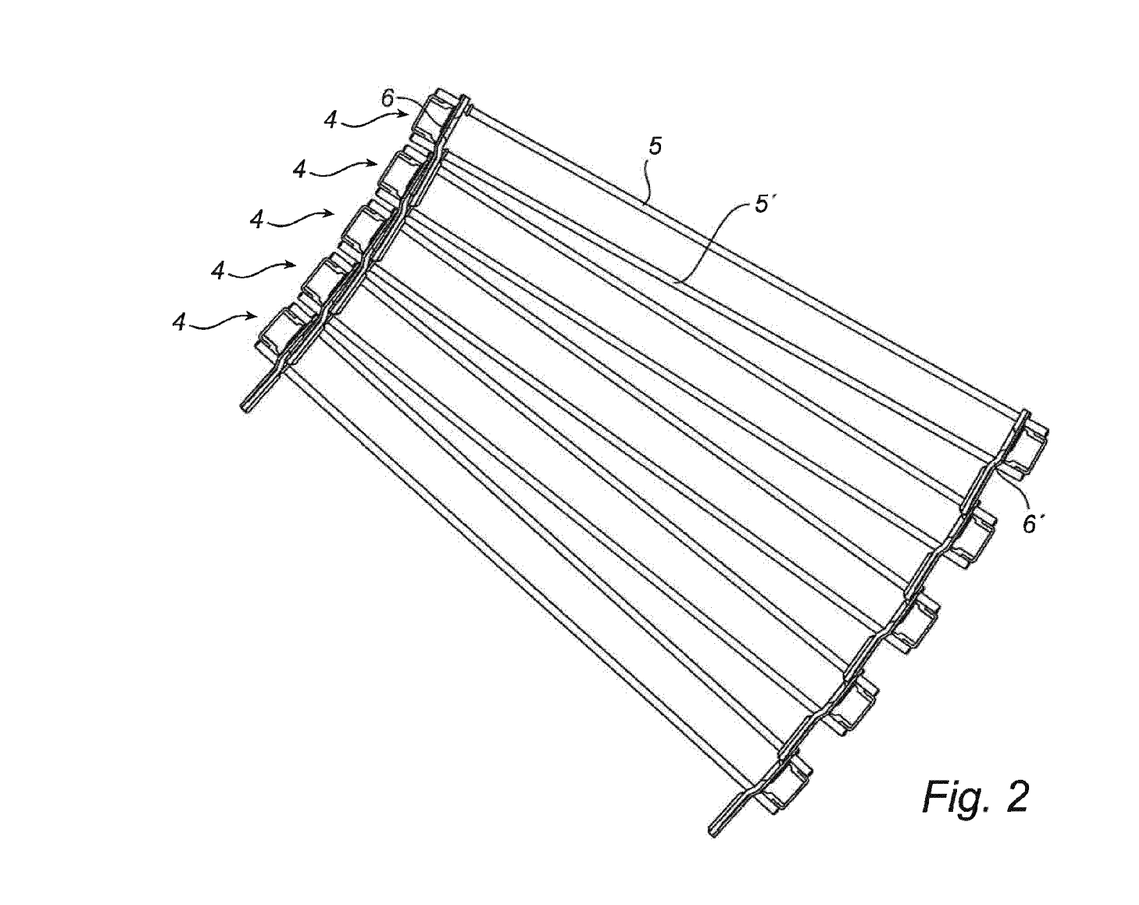
FIG. 2 is a top view of a section comprising five interconnected links of the conveyor belt shown in FIG. 1.
Figure 3:
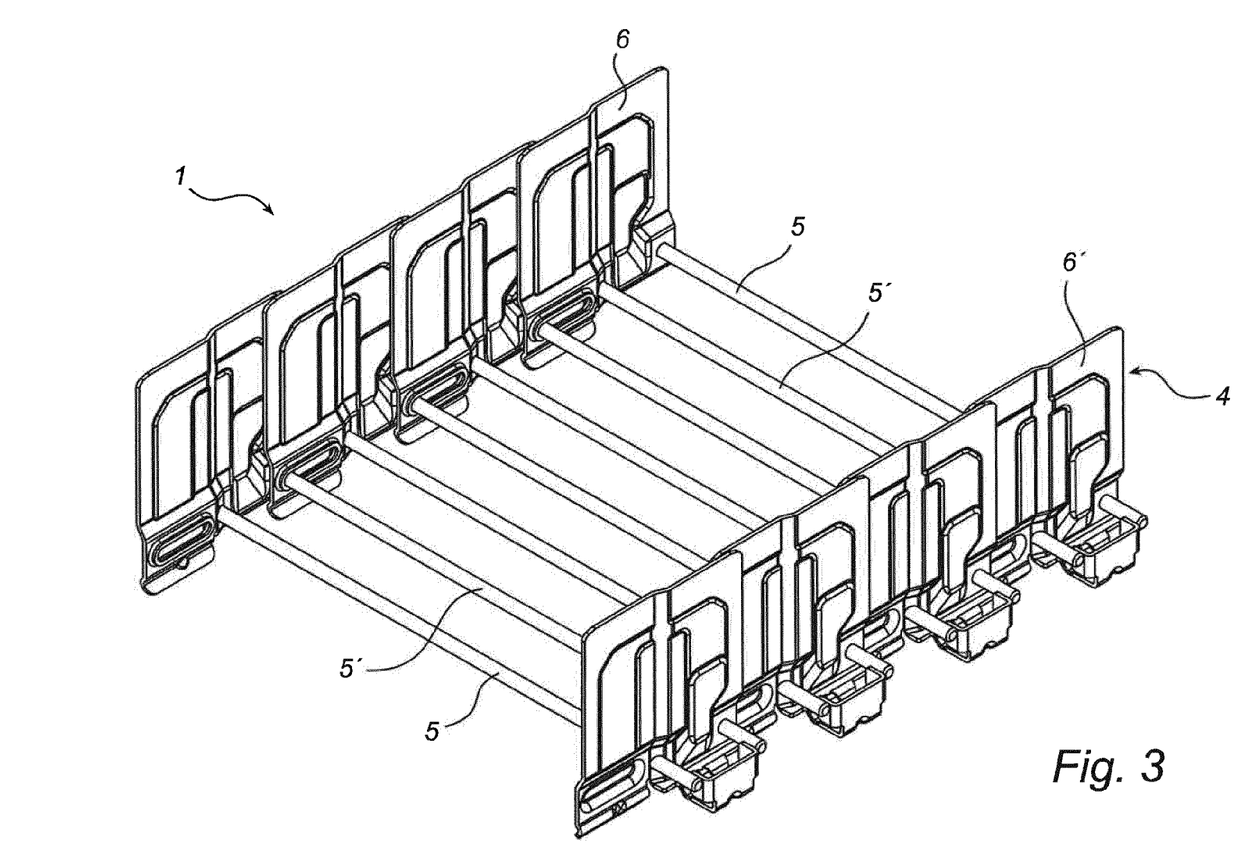
FIG. 3 is a perspective view of a section comprising four interconnected links of the conveyor belt shown in FIG. 1.

An embodiment of a conveyor belt 1 is partially illustrated in figures 2 and 3. As mentioned above the conveyor belt 1 comprises a plurality of interconnected links 4. The links 4 are moreover mutually articulated and relatively adjustable. Each link 4 includes two transverse rods 5, 5' and two vertically, opposite lateral plate elements 6, 6', respectively. Normally a flexible support structure (not shown) is wrapped around the transverse rods 5, 5' in order to form a support structure for supporting products being conveyed on the conveyor belt 1. Normally, when producing a link 4 two opposite and mirrored lateral plate elements are joined together by means of two transverse rods 5, 5=. The rods 5, 5' are introduced into a respective rod connection opening 15, 16 and a weld is arranged between respectively rod 5, 5' and the lateral plate element adjacent to respectively rod opening 15, 16 in order to fixedly fasten the rods 5, 5' to the lateral plate elements 6, 6'.

The lateral plate element 6, 6' is typically made of stainless steel. However, the skilled person realizes that other materials such as aluminum or titanium also are suitable.

Figure 4:
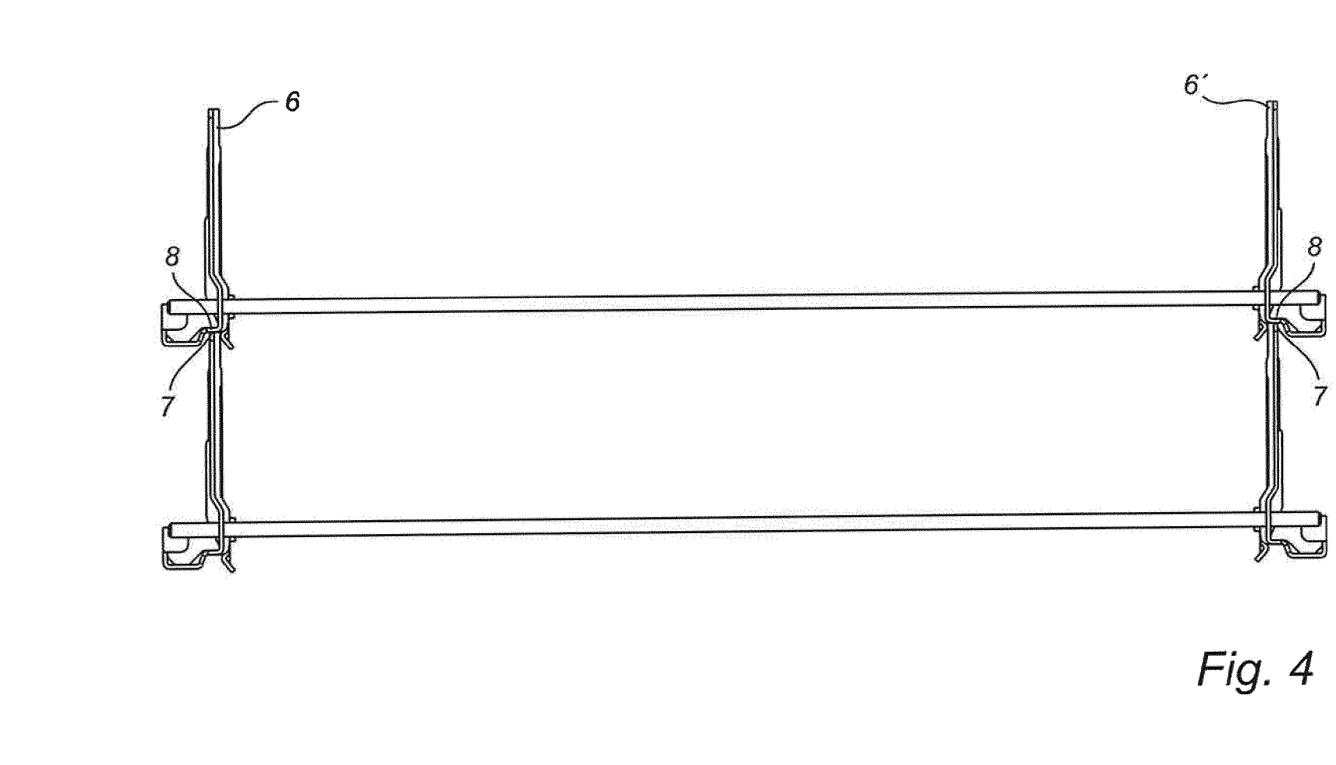
FIG. 4 is a front view showing a link in an underlying tier and a superimposed link in an overlying tier of the conveyor belt shown in FIG. 1.
Figure 5:
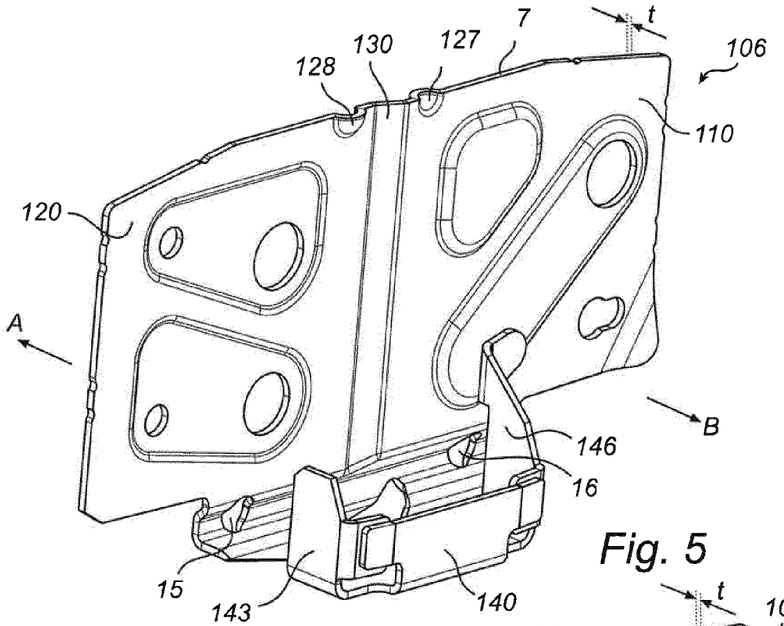
FIG. 5 is a first top perspective view of a lateral plate element in accordance with a first embodiment of the invention.
Figure 6:
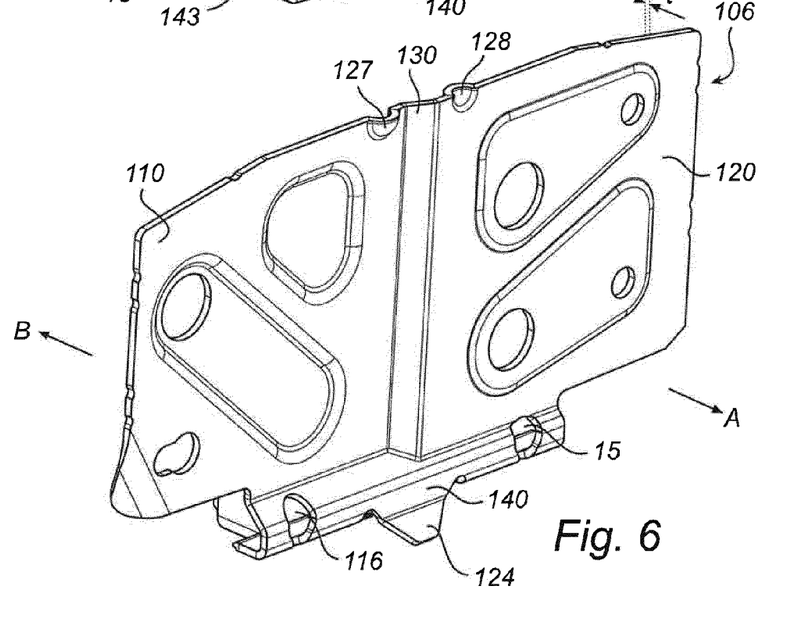
FIG. 6 is a second top perspective view of the lateral plate element of FIG. 5.
Figure 7:
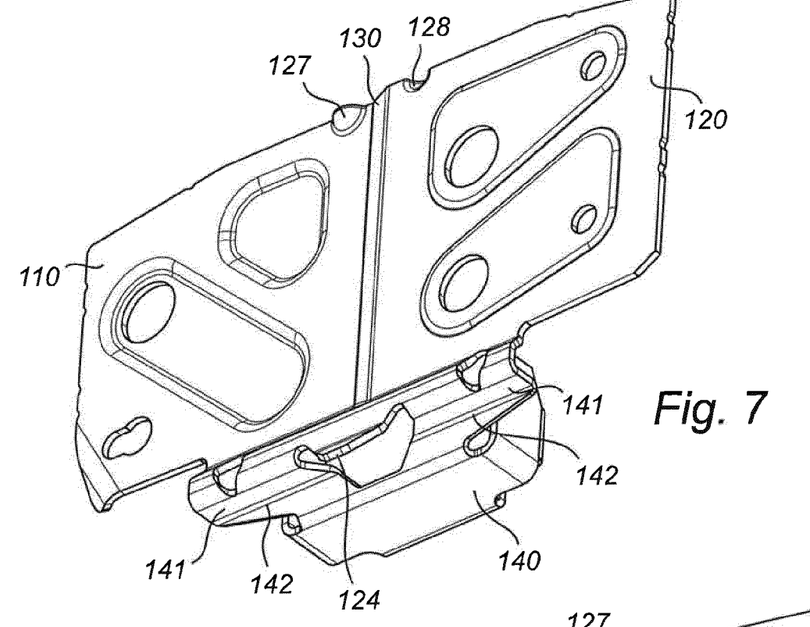
FIG. 7 is first bottom perspective view of the lateral plate element shown in FIG. 5.
Figure 8:
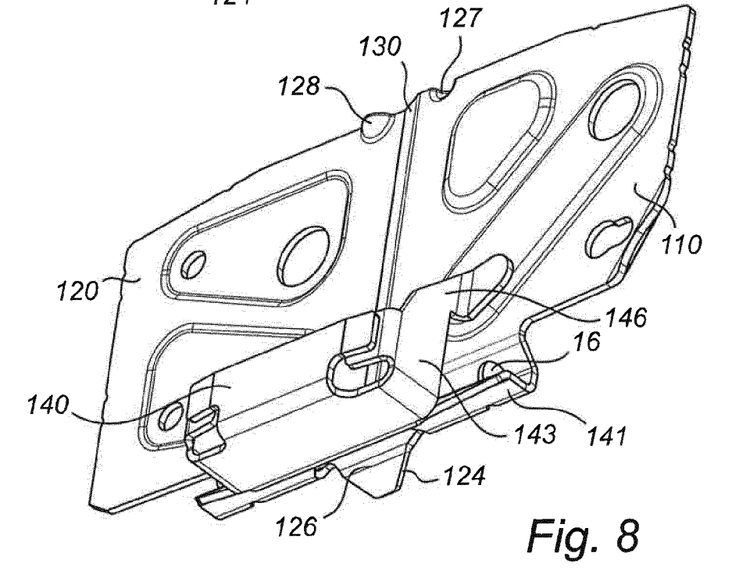
FIG. 8 is second bottom perspective view of the lateral plate element shown in FIG. 5.

Although not required the thickness of the plate material constituting the lateral plate element 6, 6' is preferably 0,5-3 mm, more preferably 1-2 mm, and even more preferably 1.5 mm. As illustrated in FIG. 4, in order to form the helical path part of the self-stacking endless conveyor belt 1 the lateral plate elements 6, 6' of the links 4 act as spacer means, wherein upper edge portions 7 of the lateral plate elements 6, 6' of the links in an underlying belt tier bear against lower edge portions 8 of the lateral plate elements 6, 6' of the links in an overlying belt tier and thus support the overlying belt tier via the respective edge portions.

A lateral plate element 106 according to a first embodiment of the present invention is illustrated in FIGS. 5-8.

The lateral plate element 106 includes an outer plate section 110, an inner plate section 120 and a bridging plate section 130 bridging said outer and inner plate sections 110, 120. The inner plate section 120 is offset in an inward direction A with respect to the outer plate section 110. Although not required, the offset is preferably between t and two times t, t being the thickness of the plate material constituting the lateral plate element 106.

The inner plate section 120 being offset the outer plate section 110 enables the outer plate section 110 on a adjacent link 4 to extend over the outer surface of the inner plate section 120 on the adjacent link 4, see figures 2 and 3. During assembly, the inner plate section 120 on one link 4 and the outer plate section 110 on the adjacent link 4 overlap and enables thereby the adjacent lateral plate elements 106 to slide together as the belt 1 moves from a straight or helical path 2, 3, respectively.

The lateral plate element 106 further comprises a bottom structure 140. The bottom structure 140 comprises a resting surface 141, an outer abutment surface 142, a tab section 124 comprising an inner abutment surface 126, and two welding surfaces 143 onto which a respective end of the transverse rods 5, 5' is to be welded, see FIGS. 2-4 wherein the rods 5, 5' are welded to respective welding surface 143.

The resting surface 141 may be planar as in the shown embodiment. Moreover, the resting surface 141 may be split in two or more parts. In the shown embodiment the resting surface is split in two parts. During use, the upper edge 7 of a lateral plate element of a link of an underlying tier contacts the resting surface 141, above, in connection with FIG. 4, described as the lower edge portion 8, of the lateral plate elements, of a link of an overlaying tier. Thus, the tiers of the conveyor belt in the helical path are laterally aligned by resting the upper edge 7 of the lateral plate elements of the links of an underlying tier against the resting surfaces of the lateral plate elements of the links of an overlying tier.

The resting surface 141 is offset from said two rod connection openings 15, 16. Thus, when the conveyer belt 1 is stacked in tiers, the upper edge of a lateral plate element of a link of an underlying tier rests solely against the resting surface of a lateral plate element of a link of an overlying tier. Because the weight of the portion of the conveyor belt 1 above the link 4 is no longer exerted on the transverse rods 5, 5', wear on the transverse rods 5, 5' is reduced.

The outer abutment surface 142 extends diagonally downward and outward (in the outward direction B) from said resting surface 141. The outer abutment surface 142 limits outward lateral movement of a lateral plate element of an underlying tier. Thus, when the lateral plate elements 106 form part of a link 4 of a conveyor belt 1, the outer abutment surfaces of successive links 4 form outer abutment surfaces engaging the outer side of the upper portions of the links of an underlying belt tier.

The two welding surfaces 143 onto which an end of respectively transverse rods 5, 5' are to be welded extend in a plane orthogonal to said third plane and perpendicular to said axis connecting the centre of the two rod connection openings 15, 16. Welding the transverse rods 5, 5' to the welding surfaces 143 stiffens the lateral plate link 106.

The inner abutment surface 126 extends diagonally downward and inward (in the inward direction A) from said bottom edge. The inner abutment surface 126 limits inward lateral movement of a lower lateral plate element over an upper lateral plate element when the conveyor belt is in a self-stacked configuration. Moreover, the inner abutment surface 126 limits outward lateral movement of an upper lateral plate element over a lower lateral plate element when the conveyor belt is in a self-stacked configuration. Thus, when the lateral plate elements 106 form part of a link 4 of a conveyor belt 1 the inner abutment surfaces of successive links 4 form inner abutment surfaces engaging the inner side of the upper portions of the links of an underlying belt tier.

Although not required, the offset between the said inner and outer abutment surfaces 126, 142 is preferably 2-6 times the thickness t of the plate material constituting the lateral plate element 106.

Further, the bottom structure comprises an arm 146 extending to the outer plate section 110 of the lateral plate element 106. The arm 146 is fixedly connected to the outer plate section 110 by for example welding. By arranging the arm 146 extending from the bottom structure 140 to the outer plate section 110 of the lateral plate element 106, the lateral plate element 106 is strengthened.

Furthermore a spacer element 127 is arranged at said upper edge 7 of the lateral plate element 106. More precisely, the spacer element 127 is arranged at said outer plate section 110. By arranging the spacer element 127 at said upper edge 7 it will be easy to apply the spacer element 127 on an already manufactured lateral plate element 106. The top spacer element 127 extends in said inward direction A. The spacer element 127 is arranged to further prevent lateral movement between lateral plate elements of neighboring tiers of the conveyor belt 1. Especially, the spacer element 127 is arranged to engage with said inner abutment surface 126 of said tab section 124. Although not required, the extension of the spacer element 127 in said inward direction A is preferably 0.5-3 times the thickness t of the plate material constituting the lateral plate element 106. The spacer element 127 is in the form of a first bulge. According to the shown embodiment the first bulge is a press shaped structure. The spacer element 127 being a press shaped bulge makes it easy to manufacture the lateral plate element 106. Moreover, by the spacer element 127 being a press shaped bulge the spacer element 127 may be applied to an already existing lateral plate element 106 using a press shaping tool, possibly, a handheld press shaping tool. In the shown embodiment, said spacer element 127 is a point shaped bulge. However, an ordinary skilled person in the art realizes that the spacer element 127 may exhibit various other shapes, such as being an elongate structure.

Moreover, an upper edge extension means 128 is arranged at the upper edge 7 of the lateral plate element 106. The upper edge extension means 128 extends in said outward direction B. The upper edge extension means 128 is arranged to extend the width of the contact surface between the resting surface 141 of a lateral plate element of an overlying tier of the self-stacking endless conveyor belt 1 and the upper edge 7 of a lateral plate element of an underlying tier of the self-stacking endless conveyor belt 1, when the self-stacking endless conveyor belt 1 extends helically. By extending this width, the risk of wedging between a lateral plate element in an overlying tier and a lateral plate element in an underlying tier of the conveyor belt 1, is reduced. Although not required, the extension of the upper edge extension means 128 in said outward direction B is preferably 0.5-3 times the thickness t of the plate material constituting the lateral plate element 6. The upper edge extension means 128 is in the form of a second bulge. According to the shown embodiment the second bulge is a press shaped structure. The upper edge extension means 128 being a press shaped bulge make it easy to manufacture the lateral plate element 106. Moreover, by the upper edge extension means 128 being a press shaped bulge the upper edge extension means 128 may be applied to an already existing lateral plate element 106 using a press shaping tool, possibly, a handheld press shaping tool. In the shown embodiment, said upper edge extension means 128 is a point shaped bulge. However, an ordinary skilled person in the art realizes that the upper edge extension means 128 may exhibit various other shapes, such as being an elongate structure.

Figure 9:
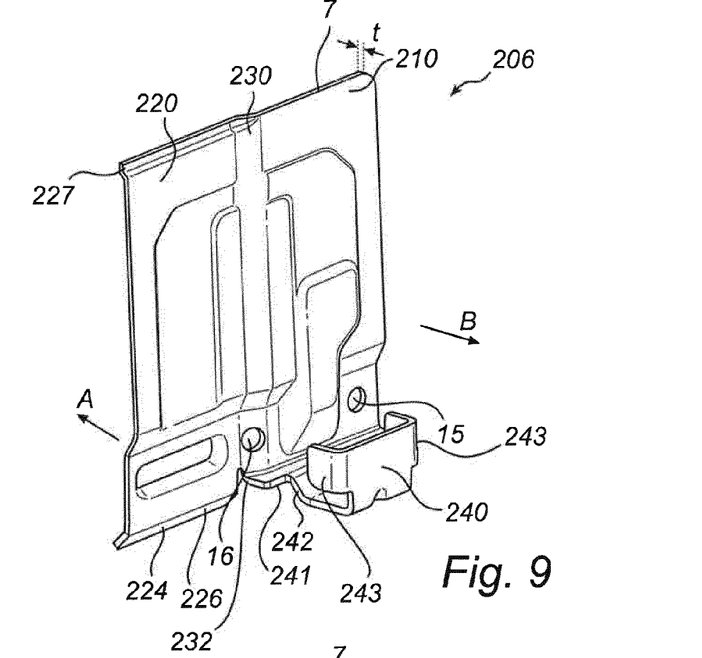
FIG. 9 is a top perspective view of a lateral plate element according to a second embodiment of the invention.
Figure 10:
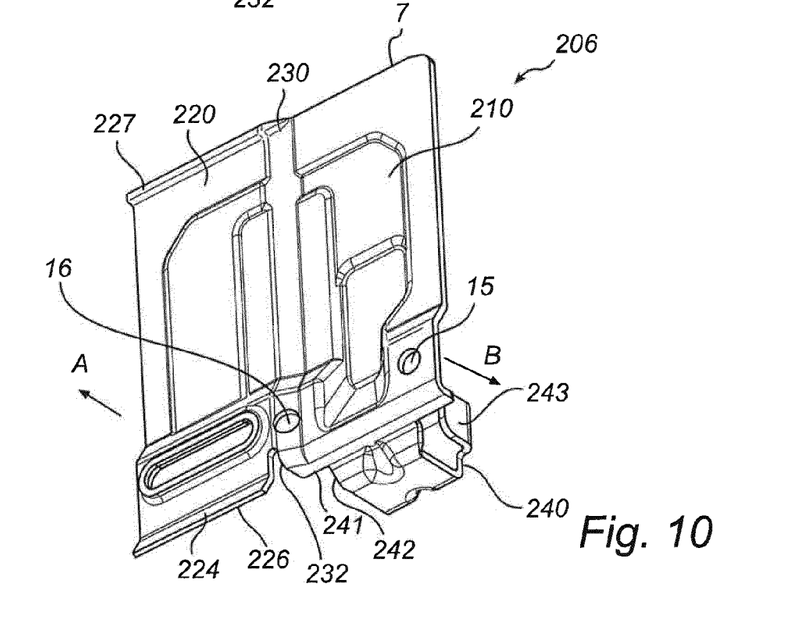
FIG. 10 is bottom perspective view of the lateral plate element shown in FIG. 9.

A lateral plate element 206 according to a second embodiment of the present invention is illustrated in FIGS. 9-10. The lateral plate element 206 includes an outer plate section 210, an inner plate section 220 and a bridging plate section 230 bridging said outer and inner plate sections 210, 220. The inner plate section 220 is offset in an inward direction A with respect to the outer plate section 210. Although not required, the offset is preferably between t and two times t, t being the thickness of the plate material constituting the lateral plate element 206.

The inner plate section 220 being offset the outer plate section 210 enables the outer plate section 210 on a adjacent link 4 to extend over the outer surface of the inner plate section 220 on the adjacent link 4, see figures 2 and 3. During assembly, the inner plate section 220 on one link 4 and the outer plate section 210 on the adjacent link 4 overlap and thereby enables the adjacent lateral plate elements to slide together as the belt 1 moves from a straight or helical path 2, 3, respectively.

The lateral plate element 206 further comprises a first rod connection opening 15 and a second rod connection opening 16. Each rod connection opening 15, 16 is arranged to receive a transverse rod 5, 5'.

The lateral plate element 206 further comprises a bottom structure 240. The bottom structure 240 comprises a resting surface 241, an outer abutment surface 242 and two welding surfaces 243 onto which a respectively end of the transverse rods 5, 5' is to be welded, see FIGS. 2-4 wherein the rods 5, 5' are welded to respectively welding surface 243.

The resting surface 241 may be planar as in the shown embodiment. During use, the upper edge 7 of a lateral plate element of a link of an underlying tier contacts the resting surface 241, above described as the lower edge portion 8, of the lateral plate elements, of a link of an overlaying tier. Thus, the tiers of the conveyor belt in the helical path are laterally aligned by resting the upper edge 7 of the lateral plate elements of the links of an underlying tier against the resting surfaces of the lateral plate elements of the links of an overlying tier.

The resulting surface 241 is offset from said two rod connection openings 15, 16. Thus, when the conveyor belt 1 is stacked in tiers, the upper edge of a lateral plate element of a link 4 of an underlying tier rests solely against the resting surface 241 of a lateral plate element of a link 4 of an overlying tier. Because the weight of the portion of the conveyor belt 1 above the links 4 is no longer exerted on the transverse rods 5, 5', wear on the transverse rods 5, 5' is reduced.

Moreover, the resting surface 241 extends to a bottom edge 232 of the bridging plate section 230. Thus, the resting surface 241 is, at least locally, extended laterally in said inward direction A. Accordingly, by extending the resting surface 241 to the bottom edge 232 of the bridging plate section 230 the width of the contact surface between the resting surface 241 of a lateral plate element of an overlying tier of the self-stacking endless conveyor belt 1 and the upper edge 7 of a lateral plate element of an underlying tier of the self-stacking endless conveyor belt 1, when the self-stacking endless conveyor belt 1 extends helically, is extended. By extending this width, the risk of wedging between a lateral plate element in an overlying tier and a lateral plate element in an underlying tier of the conveyor belt 1, is reduced.

The outer abutment surface 242 extends diagonally downward and outward (in the outward direction B) from said resting surface 241. The outer abutment surface 242 limits outward lateral movement of a lateral plate element of an underlying tier. Thus, when the lateral plate elements 206 form part of a link 4 of a conveyor belt 1, the outer abutment surfaces of successive links 4 form outer abutment surfaces engaging the outer side of the upper portions of the links of an underlying belt tier.

The inner plate section 220 comprises a tab section 224 located at the bottom of the inner plate section 220. The tab section 224 comprises an inner abutment surface 226.

The inner abutment surface 226 extends diagonally downward and inward (in the inward direction A). The inner abutment surface 226 limits inward lateral movement of a lower lateral plate element over an upper lateral plate element when the conveyor belt is in a self-stacked configuration. Moreover, the inner abutment surface 226 limits outward lateral movement of an upper lateral plate element over a lower lateral plate element when the conveyor belt is in a self-stacked configuration. Thus, when the lateral plate elements 206 form part of a link 4 of a conveyor belt 1 the inner abutment surfaces of successive links 4 form inner abutment surfaces engaging the inner side of the upper portions of the links of an underlying belt tier.

Although not required, the offset between the said inner and outer abutment surfaces 226, 242 is preferably 2-6 times the thickness t of the plate material constituting the lateral plate element 206.

The two welding surfaces 243 onto which an end of respectively transverse rods 5, 5' are to be welded extend in a plane orthogonal to said third plane and perpendicular to said axis connecting the centre of the two rod connection openings 15, 16. Welding the transverse rods 5, 5' to the welding surfaces 43 stiffens the lateral plate link 6 even further, especially the bottom part of the lateral plate element 206.

Furthermore a spacer element 227 is arranged at said upper edge 7 of the lateral plate element 206. More precisely, the spacer element 227 is arranged at said inner plate section 220. By arranging the spacer element 227 at said upper edge 7 it will be easy to apply the spacer element 227 on an already manufactured lateral plate element 206. The top spacer element 227 extends in said inward direction A. The top spacer element 227 is arranged to further prevent lateral movement between lateral plate elements of neighboring tiers of the conveyor belt 1. Especially, the spacer element 227 is arranged to engage with said inner abutment surface 226 of said tab section 224. Although not required, the extension of the spacer element 227 in said inward direction A is preferably 0.5-3 times the thickness t of the plate material constituting the lateral plate element 6. The spacer element 227 is in the form of a first bulge. According to the shown embodiment the first bulge is a press shaped structure. The spacer element 227 being a press shaped bulge makes it easy to manufacture the lateral plate element 206. Moreover, by the spacer element 227 being a press shaped bulge the spacer element 227 may be applied to an already existing lateral plate element 206 using a press shaping tool, possibly, a handheld press shaping tool. In the shown embodiment, said spacer element 227 is an elongate structure. However, an ordinary skilled person in the art realizes that the spacer element 227 may exhibit various other shapes, such as being a point shaped bulge.

Figure 11:
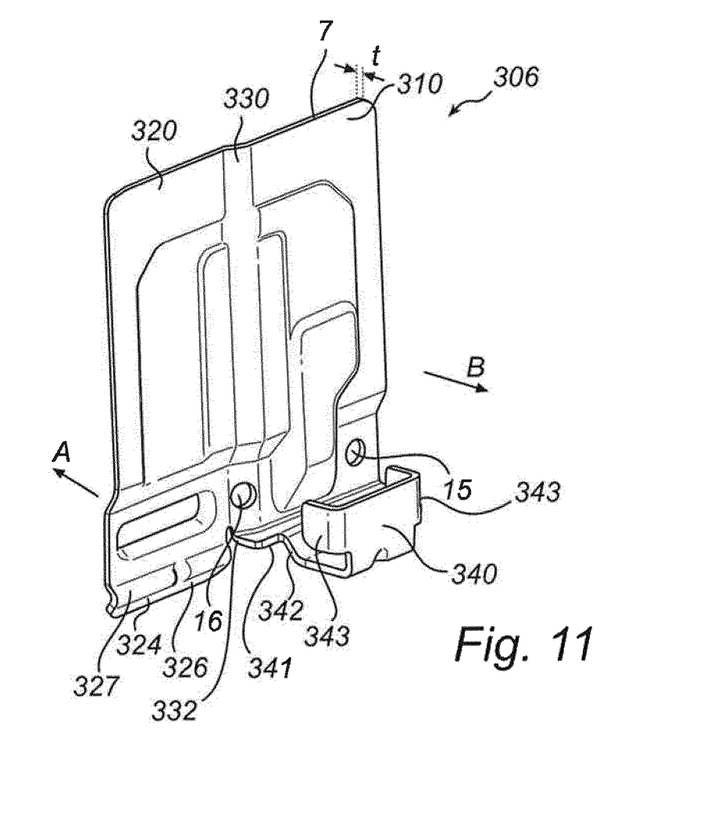
FIG. 11 is a top perspective view of a lateral plate element according to a third embodiment of the invention.

A third embodiment of a lateral plate element 306 according to the present invention is shown in FIG. 11. This third embodiment resembles very much the second embodiment discussed above. Because of this, only the difference between these two embodiments will be discussed below. In this third embodiment a spacer element 327 is located at a tab section 324 of the lateral plate element 306. More precisely the spacer element 327 is located on an inner abutment surface 326 of the tab section 324 of the lateral plate element 306. The spacer element 327 extends in the outward direction B. The spacer element 327 is arranged to further prevent lateral movement between plate elements of neighboring tiers of the conveyor belt 1. Especially, the spacer element 327 is arranged to engage with the upper part of an inner plate section 320 of a lateral plate element of an underlying tier. Although not required, the extension of the spacer element 127 in said inward direction A is preferably 0.5-3 times the thickness t of the plate material constituting the lateral plate element 306. The spacer element 327 is arranged to even further prevent lateral movement between lateral plate elements of neighboring tiers of the conveyor belt 1.

Above some embodiment of the present invention are described however, it is appreciated that the present invention is not limited to the embodiments shown. Several modifications and variations are thus conceivable within the scope of the invention.

For example the arm extending from the bottom structure may extend to and being fixedly connected to the inner plate section instead.

The lateral plate element may even comprise two arms, one extending from the bottom structure to the inner plate section and one extending from the bottom structure to the outer plate section.

The invention claimed is:

1. A lateral plate element for a link included in a self-stacking endless conveyor belt comprising a plurality of interconnected links, in which the conveyor belt extends helically along part of its length such that upper edge portions of the lateral plate elements of the links in an underlying tier bear against lower edge portions of the lateral plate elements of the links in an overlying belt tier, the lateral plate element of the link comprising:
    an outer plate section, an inner plate section, and a bridging plate section bridging said outer and inner plate sections;
    a resting surface arranged to engage a lateral plate element of an underlying tier of the self-stacking endless conveyor belt when it extends helically;
    an upper portion with an associated upper edge arranged to engage the resting surface of a lateral plate element of an overlaying tier of the self-stacking endless conveyor belt when it extends helically;
    an inner abutment surface arranged to engage the upper portion of the underlying lateral plate element, wherein the inner abutment surface depends downwardly relative to the resting surface and limits outward lateral movement of the lateral plate element relative the underlying lateral plate element;
    an outer abutment surface arranged to engage the upper portion of the underlying lateral plate element, wherein the outer abutment surface depends downwardly relative to the resting surface and limits inward lateral movement of the lateral plate element relative the underlying lateral plate element; and
    a spacer element structurally distinct from the upper portion of the underlying lateral plate element and arranged to further limit outward lateral movement of the lateral plate element relative the underlying lateral plate element, wherein the spacer element is arranged at said upper edge and is extending in an inward direction.

2. Lateral plate element according to claim 1, wherein the spacer element is arranged on the outer plate section.

3. Lateral plate element according to claim 1, wherein the spacer element is arranged on the inner plate section.

4. Lateral plate element according to claim 1, wherein the extension of the spacer element in said inward direction is 0.5-3 times the thickness of the plate material constituting the lateral plate element.

5. Lateral plate element according to claim 1, wherein the spacer element is in the form of a bulge.

6. Lateral plate element according to claim 1, wherein the spacer element is a press shaped structure.

7. Lateral plate element according to claim 1, wherein the spacer element is point shaped.

8. Lateral plate element according to claim 1, wherein the spacer element is elongate.

9. Lateral plate element according to claim 1, further comprising an upper edge extension means arranged at said upper edge and extending in an outward direction.

10. Lateral plate element according to claim 9, wherein the upper edge extension means is in the form of a bulge.

11. Lateral plate element according to claim 9, wherein the upper edge extension means is a press shaped structure.

12. Lateral plate element according to claim 9, wherein the upper edge extension means is point shaped.

13. Lateral plate element according to claim 9, wherein the upper edge extension means is elongate.

14. Lateral plate element according to claim 9, wherein the extension of the upper edge extension means in said outward direction is 0.5-3 times the thickness of the plate material constituting the lateral plate element.

15. Lateral plate element according to claim 1, wherein the offset between the said inner and outer abutment surfaces is preferably 2-6 times the thickness of the plate material constituting the lateral plate element.

16. Lateral plate element according to claim 1, wherein the extension of the spacer element in said inward direction is 1-2 times the thickness of the plate material constituting the lateral plate element.

17. A lateral plate element for a link included in a self-stacking endless conveyor belt comprising a plurality of interconnected links, in which the conveyor belt extends helically along part of its length such that upper edge portions of the lateral plate elements of the links in an underlying tier bear against lower edge portions of the lateral plate elements of the links in an overlying belt tier, the lateral plate element of the link comprising:
    an outer plate section, an inner plate section, and a bridging plate section bridging said outer and inner plate sections;
    a resting surface arranged to engage a lateral plate element of an underlying tier of the self-stacking endless conveyor belt when it extends helically;
    an upper portion with an associated upper edge arranged to engage the resting surface of a lateral plate element of an overlaying tier of the self-stacking endless conveyor belt when it extends helically;
    an inner abutment surface arranged to engage the upper portion of the underlying lateral plate element, wherein the inner abutment surface limits outward lateral movement of the lateral plate element relative the underlying lateral plate element;
    an outer abutment surface arranged to engage the upper portion of the underlying lateral plate element, wherein the outer abutment surface limits inward lateral movement of the lateral plate element relative the underlying lateral plate element; and
    a spacer element arranged to further limit outward lateral movement of the lateral plate element relative the underlying lateral plate element, wherein the spacer element is arranged at said upper edge and is extending in an inward direction; and
    a second spacer element arranged on the inner abutment surface and extending in an outward direction.

18. Lateral plate element according to claim 17, wherein the extension of the spacer element in said outward direction is preferably 0.5-3 times the thickness of the plate material constituting the lateral plate element.

19. A link for self-stacking endless conveyor belt, in which the conveyor belt extends helically along part of its length, said link comprising:
- at least two transverse rods;
- at least two lateral plate elements, wherein the upper edge portions of the lateral plate elements of the links in an underlying tier bear against lower edge portions of the lateral plate elements of the links in an overlying belt tier, the lateral plate element of the link comprising:
- an outer plate section, an inner plate section, and a bridging plate section bridging said outer and inner plate sections;
- a resting surface arranged to engage a lateral plate element of an underlying tier of the self-stacking endless conveyor belt when it extends helically;
- an upper portion with an associated upper edge arranged to engage the resting surface of a lateral plate element of an overlaying tier of the self-stacking endless conveyor belt when it extends helically;
- an inner abutment surface arranged to engage the upper portion of the underlying lateral plate element, wherein the inner abutment surface limits outward lateral movement of the lateral plate element relative the underlying lateral plate element;
- an outer abutment surface arranged to engage the upper portion of the underlying lateral plate element, wherein the outer abutment surface limits inward lateral movement of the lateral plate element relative the underlying lateral plate element; and
- a spacer element arranged to further limit outward lateral movement of the lateral plate element relative the underlying lateral plate element, wherein the spacer element is arranged at said upper edge and is extending in an inward direction; and wherein the at least two rods are fixedly connected to said lateral plate elements in order to form the link.

20. A self-stacking endless conveyor belt, in which the conveyor belt extends helically along part of its length, comprising a plurality of interconnected links, said links comprising lateral plate elements, said lateral plate elements comprising:
- an outer plate section, an inner plate section, and a bridging plate section bridging said outer and inner plate sections;
- a resting surface arranged to engage a lateral plate element of an underlying tier of the self-stacking endless conveyor belt when it extends helically;
- an upper portion with an associated upper edge arranged to engage the resting surface of a lateral plate element of an overlaying tier of the self-stacking endless conveyor belt when it extends helically;
- an inner abutment surface arranged to engage the upper portion of the underlying lateral plate element, wherein the inner abutment surface limits outward lateral movement of the lateral plate element relative the underlying lateral plate element;
- an outer abutment surface arranged to engage the upper portion of the underlying lateral plate element, wherein the outer abutment surface limits inward lateral movement of the lateral plate element relative the underlying lateral plate element; and
- a spacer element arranged to further limit outward lateral movement of the lateral plate element relative the underlying lateral plate element, wherein the spacer element is arranged at said upper edge and is extending in an inward direction.

\* \* \* \* \*